United States Patent [19]

Sato

[11] Patent Number: 5,983,028
[45] Date of Patent: Nov. 9, 1999

[54] USAGE CONTROL DEVICE

[75] Inventor: Koichi Sato, Tokyo, Japan

[73] Assignee: Asahi Kogaku Kogyo Kabushiki Kaisha, Tokyo, Japan

[21] Appl. No.: 08/803,510

[22] Filed: Feb. 20, 1997

[30] Foreign Application Priority Data

Feb. 22, 1996 [JP] Japan .............................. P08-060133

[51] Int. Cl.[6] .................................................. G03B 17/50
[52] U.S. Cl. ............................................ 396/30; 430/19
[58] Field of Search ........................... 396/30, 429, 311; 430/19, 20, 30; 369/275.21

[56] References Cited

U.S. PATENT DOCUMENTS

| | | | |
|---|---|---|---|
| 4,945,423 | 7/1990 | Takanashi et al. ................. | 358/300 |
| 5,212,556 | 5/1993 | Ogawa . | |
| 5,424,156 | 6/1995 | Aoki et al. . | |
| 5,488,601 | 1/1996 | Sakano et al. ..................... | 369/120 |
| 5,489,494 | 2/1996 | Hotta et al. ........................ | 430/19 |
| 5,497,238 | 3/1996 | Sato et al. . | |
| 5,583,670 | 12/1996 | Iijima et al. ....................... | 349/86 |
| 5,646,927 | 7/1997 | Shimizu et al. .................... | 369/99 |

FOREIGN PATENT DOCUMENTS 5-2280  8/1993  Japan .

*Primary Examiner*—Safet Metjahic
*Assistant Examiner*—John Chizmar
*Attorney, Agent, or Firm*—Greenblum & Bernstein, P.L.C.

[57] ABSTRACT

A usage control device is mounted in an electro-developing type camera with an electro-developing recording medium, by which an image is electronically developed. The electro-developing recording medium has an image recording area and a data recording area. The image is electronically developed and recorded in the image recording area. Data which indicates the number of times that a recording operation of the electro-developing recording medium has taken place, is magnetically recorded in the data recording area. The data recording area is composed of a magnetic recording medium, such as a magnetic tape.

17 Claims, 15 Drawing Sheets

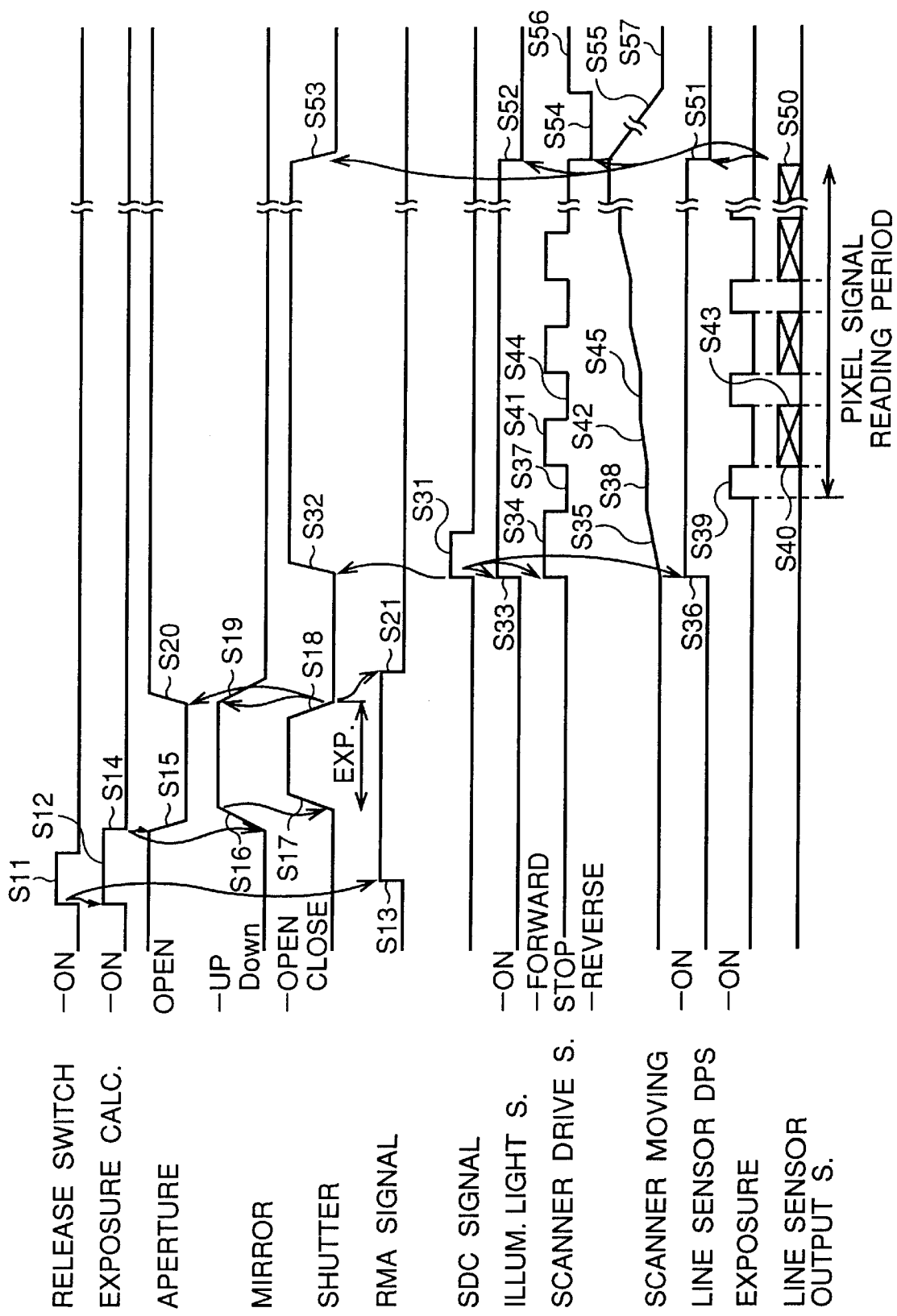

USAGE CONTROL DEVICE

BACKGROUND OF THE INVENTION

1. Field of the Invention

The present invention relates to a camera using a recording medium in which an object image obtained through a photographing optical system is electronically developed, and more particularly, to a device for controlling the frequency of times that the object image has been recorded in the recording medium.

2. Description of the Related Art

Conventionally, as disclosed in Japanese Unexamined Patent Publication No. 5-2280 and U.S. Pat. No. 5,424,156, a photographic material which is directly electronically developed so that the developed visible image can be immediately obtained is known. In this specification, such a recording medium is referred to as an electro-developing recording medium, and an electronic still camera using the electro-developing recording medium is referred to as an electro-developing type camera.

An image recorded in the electro-developing recording medium can be erased by heating the recording medium a predetermined temperature. However, if recording and erasing operations to the electro-developing recording medium are repeatedly carried out, a problem can occur in which the electro-developing recording medium deteriorates. Thus a clear image cannot be recorded thereon. Further, a problem can occur in which a clear image cannot be recorded on the electro-developing recording medium.

SUMMARY OF THE INVENTION

Therefore, an object of the present invention is to provide a control device by which the frequency or number of times of a recording operation of an electro-developing recording medium is controlled, so that it can be determined whether or not a clear image can be recorded on the recording medium.

According to the present invention, there is provided a control device controlling the frequency of usage of an electro-developing recording medium by which an image formed in an image recording area of the electro-developing recording medium is electronically developed and recorded therein. The control device comprises a data recording area formed outside of the image recording area, a data recording processor, and a data reading processor.

The data recording processor records the frequency of recording operations, in which the image is recorded in the image recording area, in the data recording area. The data reading processor reads the frequency of recording operations, which is recorded in the data recording area.

Further, according to the present invention, a device is provided for controlling the frequency of usage of an electro-developing recording medium by which an image is electronically developed. The electro-developing recording medium has an image recording area and a data recording area. The control device comprises an image recording processor, an image erasing processor, and a data recording processor.

The image recording processor performs a recording operation in which the image is recorded in the image recording area. The image erasing processor performs an erasing operation in which the image recorded in the image recording area is erased. The data recording processor records the frequency of times of one of the recording operation and the erasing operation.

BRIEF DESCRIPTION OF THE DRAWINGS

The objects and advantages of the present invention will be better understood from the following description, with reference to the accompanying drawings in which:

FIG. 7 is a timing chart showing a recording operation in which an image is recorded in the electro-developing recording medium, and a reading operation in which the image is read therefrom;

DESCRIPTION OF THE PREFERRED EMBODIMENTS

Figure 1:
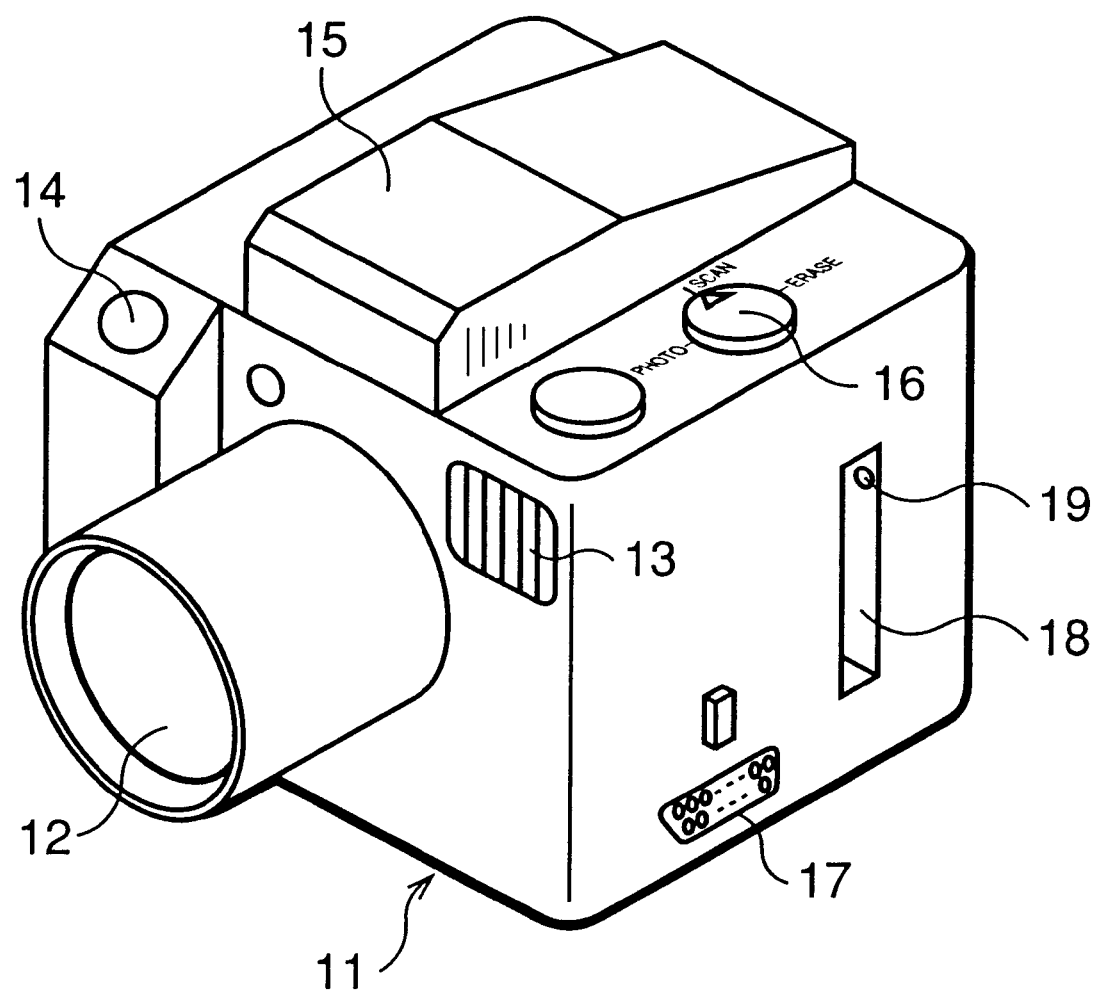
FIG. 1 is an external view showing an electro-developing type camera to which a first embodiment of the present invention is applied.

FIG. 1 is an external view of an electro-developing type camera to which a first embodiment according to the present invention is applied.

When viewing a camera body 11 from the front side, a photographing optical system 12, including a photographing lens system, is provided approximately at the center portion of the front surface of the camera body 11. An electronic flash 13 is disposed thereon to the right of and above the photographing optical system 12. A release switch 14 is provided on the side opposite to the electronic flash 13.

On the upper surface of the camera body 11, a view finder 15 is provided at the center portion thereof and extends from the front to the rear end of the camera body 11. A rotatable mode select switch 16 is provided on the upper surface beside the view finder 15. A slot 18 is provided on a side surface of the camera body 11 to mount an electro-developing recording medium therein. A recording medium sensing switch 19 is provided on the inside portion of the slot 18. An output terminal 17 is provided on a lower portion of the side surface of the camera body 11, so that an image signal obtained by this camera can be outputted to an external recording device (not shown).

Figure 2:
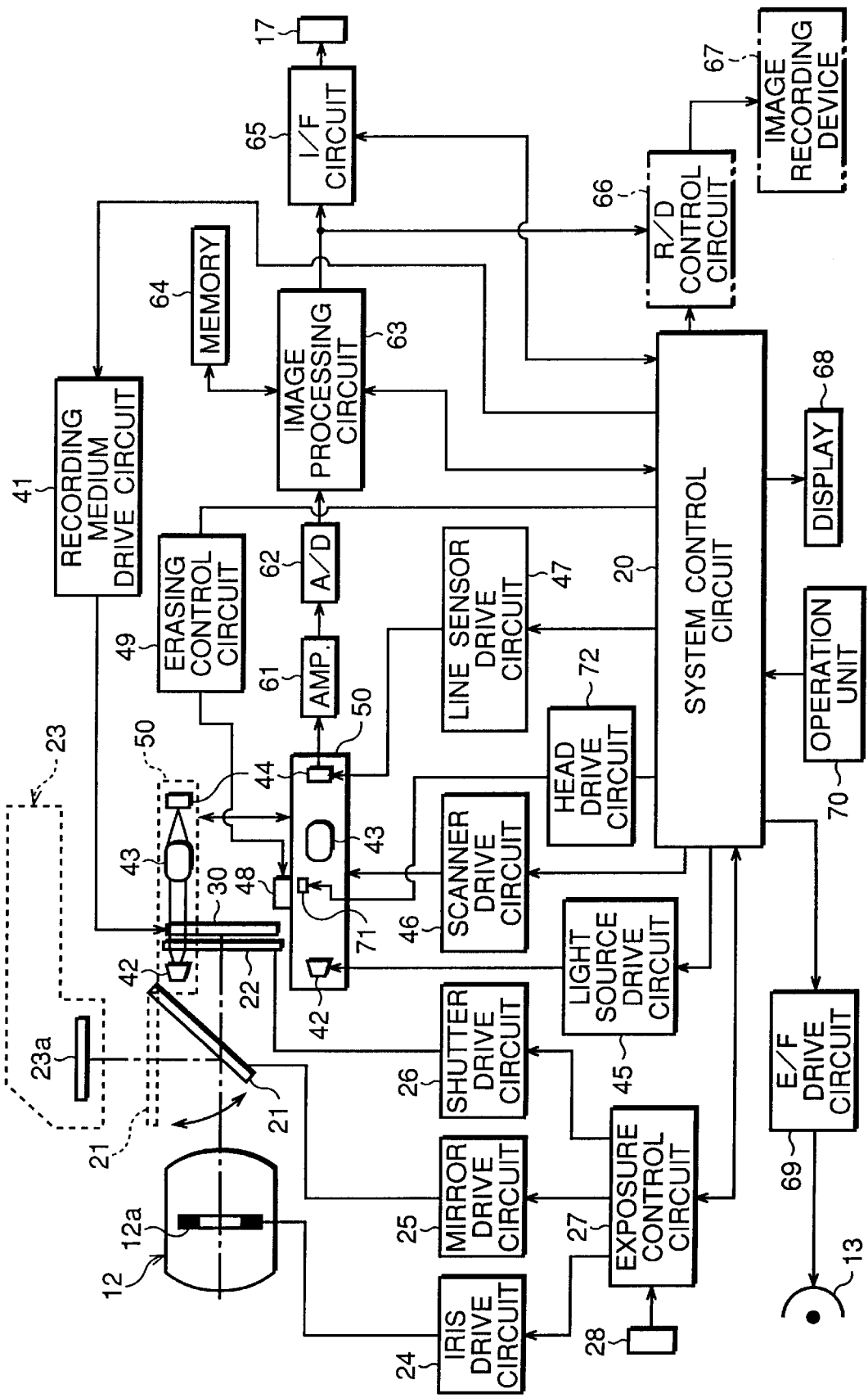
FIG. 2 is a block diagram of the electro-developing type camera shown in FIG. 1.

FIG. 2 is a block diagram of the electro-developing type camera, in which a system control circuit 20 including a microcomputer is mounted to control the electro-developing type camera.

The photographing optical system 12 has a plurality of lens groups and an aperture 12a. An electro-developing recording medium 30 is disposed behind the photographing optical system 12. A quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The aperture 12a, the quick return mirror 21, and the shutter 22 are driven by an iris drive circuit 24, a mirror drive circuit 25, and a shutter drive circuit 26, respectively, which are controlled by an exposure control circuit 27.

The exposure control circuit 27 is operated in accordance with a command signal output by the system control circuit 20. Namely, when an exposure is controlled, the size of the opening of the aperture 12a is adjusted by the iris drive circuit 24 under control of the exposure control circuit 27 based on an output signal of a photometry sensor 28.

The quick return mirror 21 is usually set to a down position (an inclining position shown by the solid line in the drawing), so that a light beam passing through the photographing optical system 12 is directed to the view-finder optical system 23 to form an object image on the focusing glass 23a. Thus an object to be photographed can be observed by the photographer through the finder optical system (not shown). When a photographing operation is carried out, the quick return mirror 21 is rotated upwards by the mirror drive circuit 25 and set to an up position (a horizontal position shown by the broken line in the drawing), so that the light beam is directed to the electro-developing recording medium 30.

The shutter 22 is usually closed. Upon occurrence of a photographing operation, the shutter 22 is opened for a predetermined period by the shutter drive circuit 26 under the control of the exposure control circuit 27. Thus, the light beam passing through the photographing optical system 12 enters a light receiving surface of the electro-developing recording medium 30, forming a two-dimensional image thereon.

An electric voltage (i.e., a recording medium activating signal) is applied to the electro-developing recording medium 30 under the control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the system control circuit 20.

A scanning mechanism 50 is provided close to the electro-developing recording medium 30. A light source 42, a scanner optical system 43, a line sensor 44, an image erasing device 48, and a recording-reproducing head 71 are supported by the scanning mechanism 50, and are moved along the electro-developing recording medium 30 by a scanning operation of the scanning mechanism 50.

The light source 42 has a plurality of LEDs (photodiodes), and can be moved along a front surface of the shutter 22 or the front surface of the electro-developing recording medium 30. The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image to an electric signal. The line sensor 44 can be moved along the rear surface of the electro-developing recording medium 30, together with the light source 42. The scanner optical system 43 is disposed between the light source 42 and the line sensor 44. When a scanning operation is carried out by the scanning mechanism 50, the scanner optical system 43 is positioned between the electro-developing recording medium 30 and the line sensor 44. The image developed by the electro-developing recording medium 30 is illuminated by the light source 42 and formed on the light receiving surface of the line sensor 44, through an operation of the scanner optical system 43. Namely, the scanner optical system 43 is disposed in the optical path of the light beam which passes through the electro-developing recording medium 30. The line sensor 44 is moved in an imaging plane, on which an image is formed by the scanner optical system 43.

ON and OFF control and the intensity control of the light source 42 are performed by a light source drive circuit 45. Control of the reading operation of pixel signals generated in the line sensor 44 is carried out by a line sensor drive circuit 47. Control of the movement of the scanning mechanism 50 is performed by a scanner drive circuit 46. The circuits 45, 46, and 47 are controlled by the system control circuit 20.

The image erasing device 48 is provided with a heater for heating the electro-developing recording medium 30, and can be moved along the rear surface thereof. ON and OFF control of the heater of the image erasing device 48 is carried out by an erasing control circuit 49 based on an erasing command signal outputted by the system control circuit 20. When the electro-developing recording medium 30 is heated by the image erasing device 48, an image recorded on the electro-developing recording medium 30 is erased.

The recording-reproducing head 71 is a magnetic head, and is provided for recording data, other than an image, and indicates the number (frequency) of times that of a recording or erasing operation of an image, takes places for example, on the electro-developing recording medium 30. The head 71 is also provided for reading the data. In other words, recording operation of the image and the reading operation of the data are performed by the common magnetic head 71, which is operated through a head drive circuit 72, based on a recording-reproducing command signal outputted by the system control circuit 20.

Pixel signals read out from the line sensor 44 are amplified by an amplifier 61, and converted to a digital signal by an A/D converter 62. The digital pixel signals are subjected to a shading correction, a gamma correction, etc. by an image processing circuit 63 under the control of the system control circuit 20, and then temporarily stored in a memory 64. The memory 64 includes an EEPROM in which correction data for the shading correction are stored. Note that the memory 64 may have a storage capacity equal to one horizontal scanning line outputted from the line sensor 44, or may have a storage capacity of pixel signals for a single frame.

The pixel signals read from the memory 64 are input to an interface circuit 65 through the image processing circuit 63, so that the pixel signals are subjected to a predetermined process such as a format conversion, and can then be outputted to an external computer (not shown) through the output terminal 17. The pixel signals outputted from the image processing circuit 63 can also be subject to a predetermined process, such as an image compression and a format conversion in a recording device control circuit 66, so that the pixel signals can be recorded on a recording medium such as an IC memory card, for example, in an image recording device 67. The interface circuit 65 and the recording device control circuit 66 are operated in accordance with a command signal outputted from the system control circuit 20.

An operation unit 70 including the release switch 14, the mode select switch 16, etc. are connected to the system control circuit 20. A photography operation (i.e., a recording operation), a reading operation, and an erasing operation of the image signal are performed by operating the release switch 14 and the mode select switch 16. A display device 68 is connected to the system control circuit 20 to indicate various setting conditions of the electro-developing type camera. Further, an electric flash drive circuit 69 is connected to the system control circuit 20 to control the flash operation of the electronic flash 13.

Figure 3:
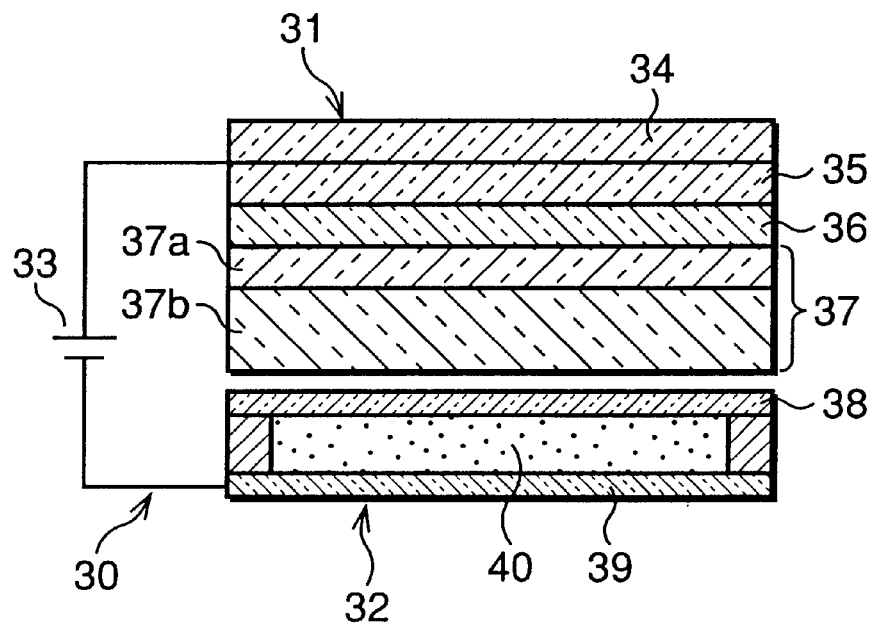
FIG. 3 is a view showing a structure of an electro-developing recording medium.

FIG. 3 shows a structure of the electro-developing recording medium 30, which is basically the same as that shown in Japanese Unexamined Patent Publication No. 5-2280.

The electro-developing recording medium 30 has an electrostatic information recording medium 31 and an electric charge storage medium 32. An electric voltage is applied thereto by an electric power source 33. The electric power source 33 corresponds to the recording medium drive circuit 41, so that ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36, and a photoconducting layer 37. The photoconducting layer 37 is formed by laminating an electric charge generating layer 37a and an electric charge transferring layer 37b. The electric charge storage medium 32 is formed by confining liquid crystal 40 between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap provided therebetween.

When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is indicated on the liquid crystal display 40 as a visible image, and thus, an object image is developed. Namely, the visible image is generated in accordance with the electric charge.

The electric charge storage medium 32 is a liquid crystal display (i.e., LCD) having a memory-type liquid crystal. The developed visible image is held therein even if the electric field is removed. The developed visible image of the LCD can be erased by heating it, or using a laser beam at a predetermined temperature. As a result, the same electric charge storage medium 32 can be used repeatedly.

Figure 4:
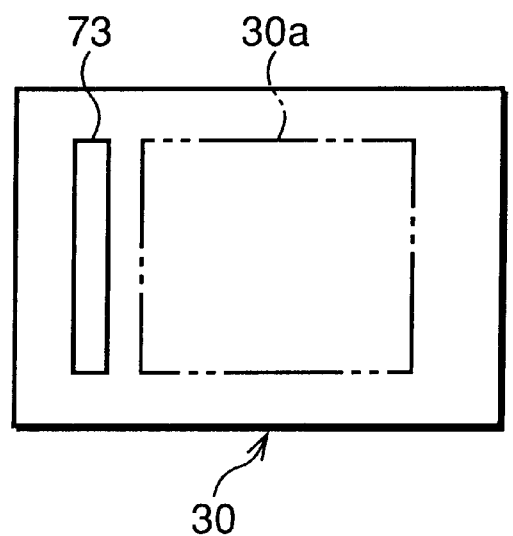
FIG. 4 is a front view showing the electro-developing recording medium.

FIG. 4 is a front view showing the electro-developing recording medium 30 when viewing from the opposite side of the photographing optical system 12. The electro-developing recording medium 30 has an image recording area 30a for recording an image, and a data recording area 73 for recording data other than the image. The image recording area 30a is rectangular. The data recording area 73 is formed outside of the image recording area 30a. The recording-reproducing head 71 is moved to read the data, as described later. The data recording area 73 extends along a direction in which the recording-reproducing head 71 is moved. The data recording area 73 is composed of a magnetic recording medium such as a magnetic tape. In other words, magnetic data is recorded in the data recording area 73.

Figure 5:
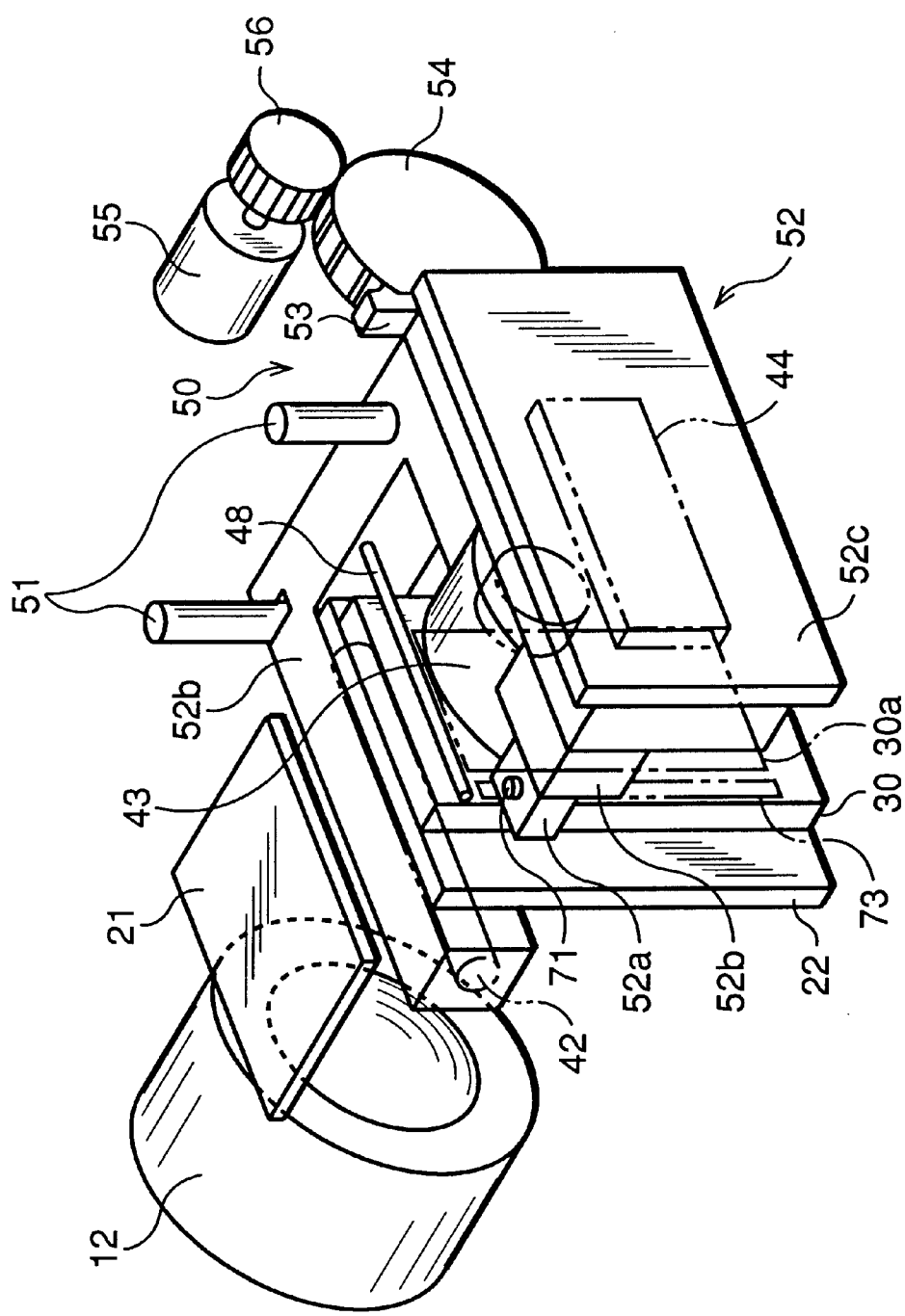
FIG. 5 is a perspective view showing a scanning mechanism.

FIG. 5 shows the structure of the scanning mechanism 50, and members or elements provided around the mechanism 50.

The scanning mechanism 50 has a moving member 52 slidably supported by a pair of guide shafts 51, first and second leg portions 52a and 52b and a support portion 52c. The first leg portion 52a extends between the quick return mirror 21 and the shutter 22. The second leg portion 52b extends behind the electro-developing recording medium 30. The support portion 52c is provided behind the second leg portion 52b. The light source 42, the scanner optical system 43, and the line sensor 44 are attached to the first leg portion 52a, the second leg portion 52b, and the support portion 52c, respectively. The image erasing device 48 has a linear electric heater, and is provided between the first and second leg portions 52a and 52b. The light source 42, the line sensor 44, and the image erasing device 48 extend in a horizontal direction. A head supporting portion 52d is provided on a surface of the second leg portion 52b, which faces the electro-developing recording medium 30. The recording-reproducing head 71 is attached to the head supporting portion 52d.

A rack 53 fixed to the moving member 52 meshes with a pinion 54, which meshes with a gear 56 provided on an output shaft of a scan drive motor 55.

When inactive, the moving member 52 is in a position offset from a path between the photographing optical system 12 and the electro-developing recording medium 30; this position being below the electro-developing recording medium 30, for example. As described later, when an image recorded on the electro-developing recording medium 30 is read, the scan drive motor 55 is rotated, and thus the moving member 52 is moved upward so that a scan of the line sensor 44 is carried out. Simultaneously, the line sensor 44 is moved in a direction perpendicular to the longitudinal direction of the line sensor 44. When the image recorded in the electro-developing recording medium 30 is erased, the moving member 52 is moved upward by the operation of the scan drive motor 55. Thus, the image erasing device 48 is moved in a direction perpendicular to the width of the electro-developing recording medium 30.

Figure 6:
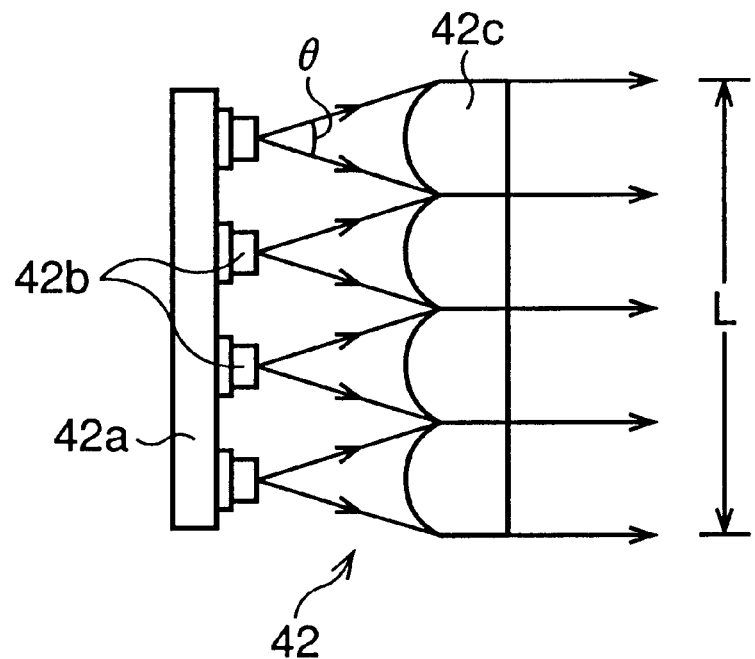
FIG. 6 is a plane view showing the light source.

FIG. 6 is a plane view showing the light source 42. A plurality of LEDs 42b are aligned on a support frame 42a. Although there are four LEDs 42b in FIG. 5, the invention is not limited to four. A collimating lens 42c is provided in front of the LEDs 42b. Although the spread angle $\theta$ of the light beam outputted by the LED 42b is 30° through 40°, for example, the light beam is converted to a parallel beam by the collimating lens 42c, and radiated onto the light receiving surface of the electro-developing recording medium 30. The light beam output by the light source 42 has a linear shape, the length (L) of which is more than or equal to the width of the electro-developing recording medium 30. The width corresponds to the longitudinal direction of the first leg portion 52a (see FIG. 5).

Figure 8:
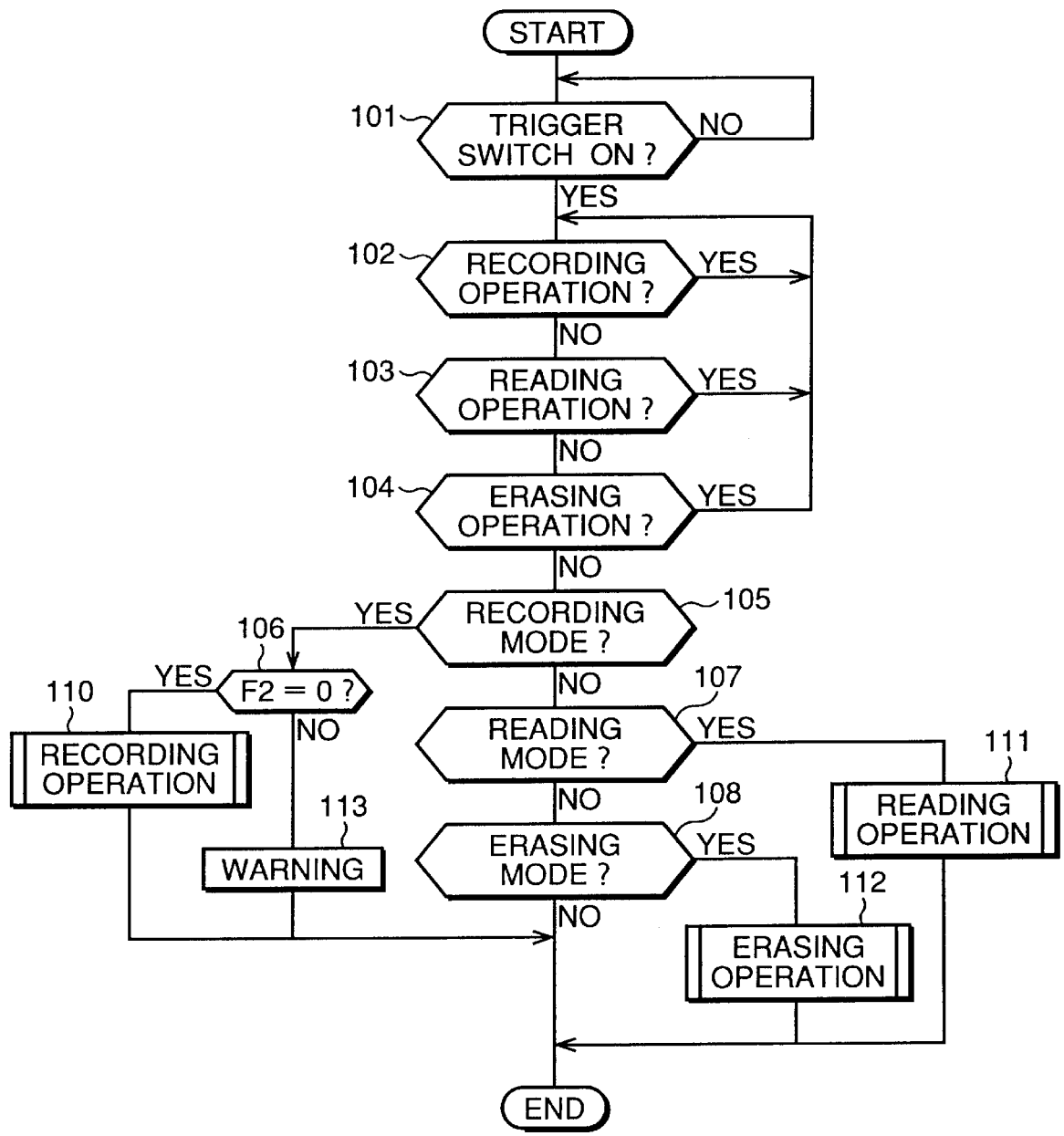
FIG. 8 is a flow chart of a program for performing a mode setting operation.
Figure 9:
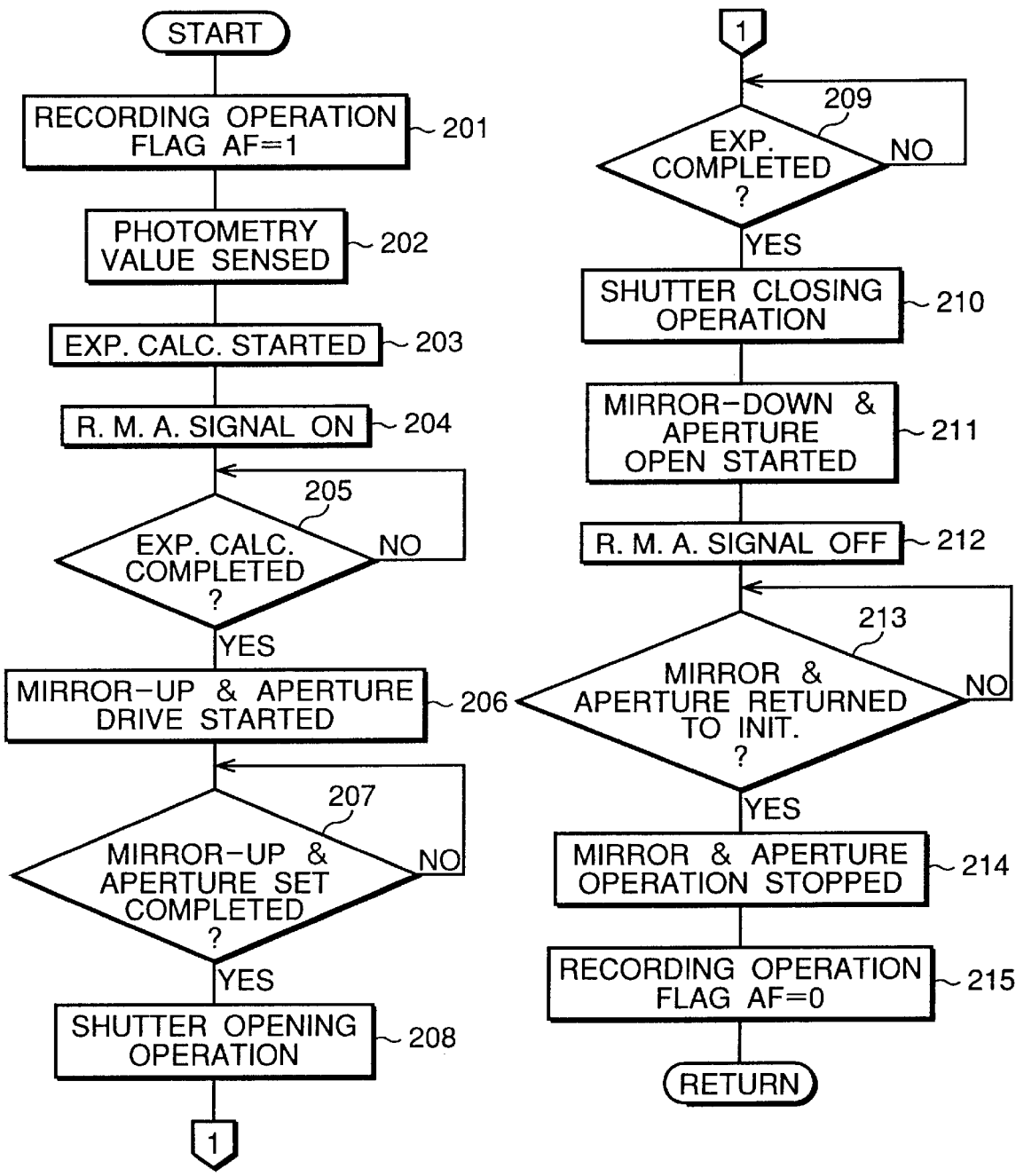
FIG. 9 is a flow chart of a program for performing a recording operation.
Figure 10A:
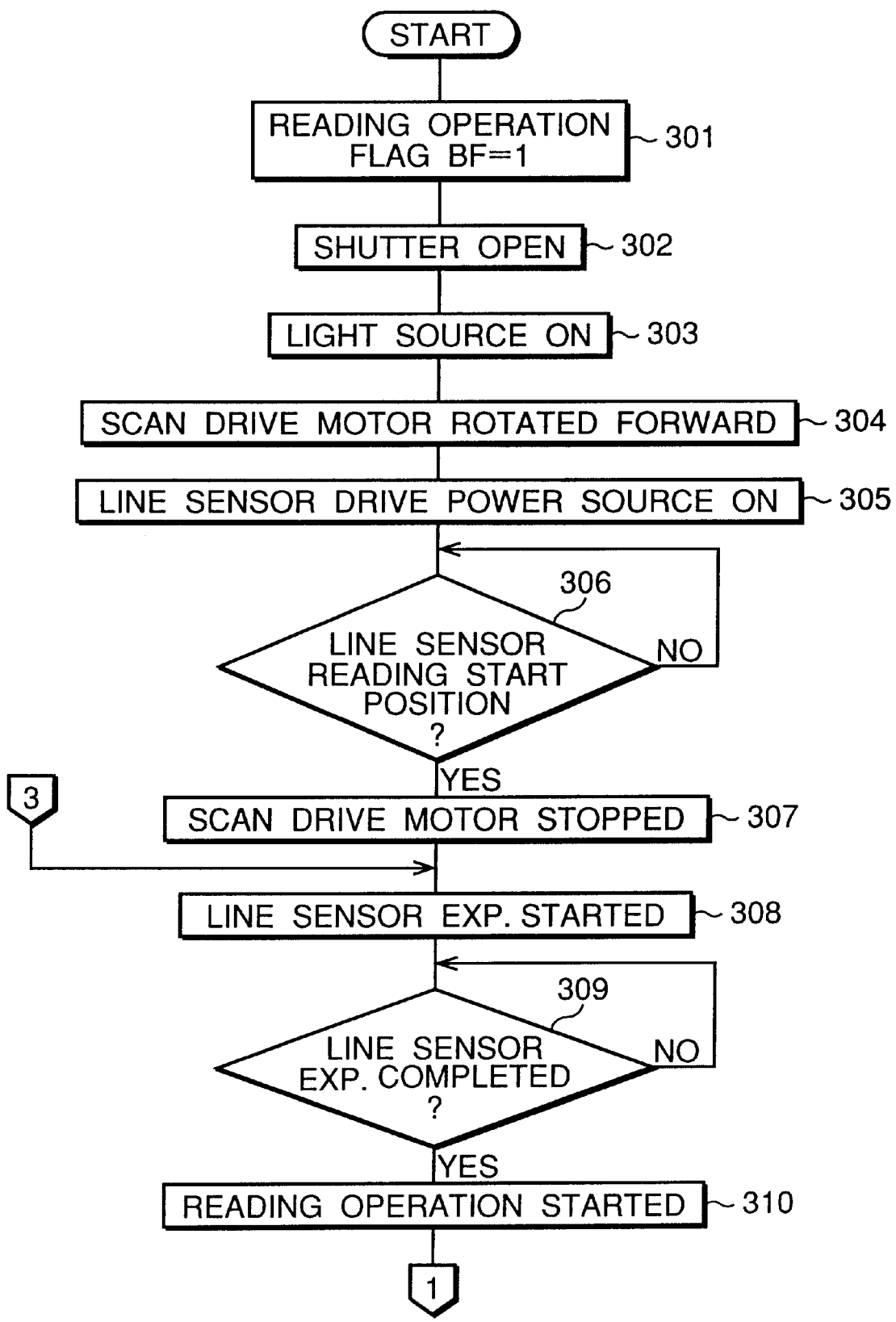
FIGS. 10A, 10B, and 10C are flow charts of a program for performing the reading operation.
Figure 10B:
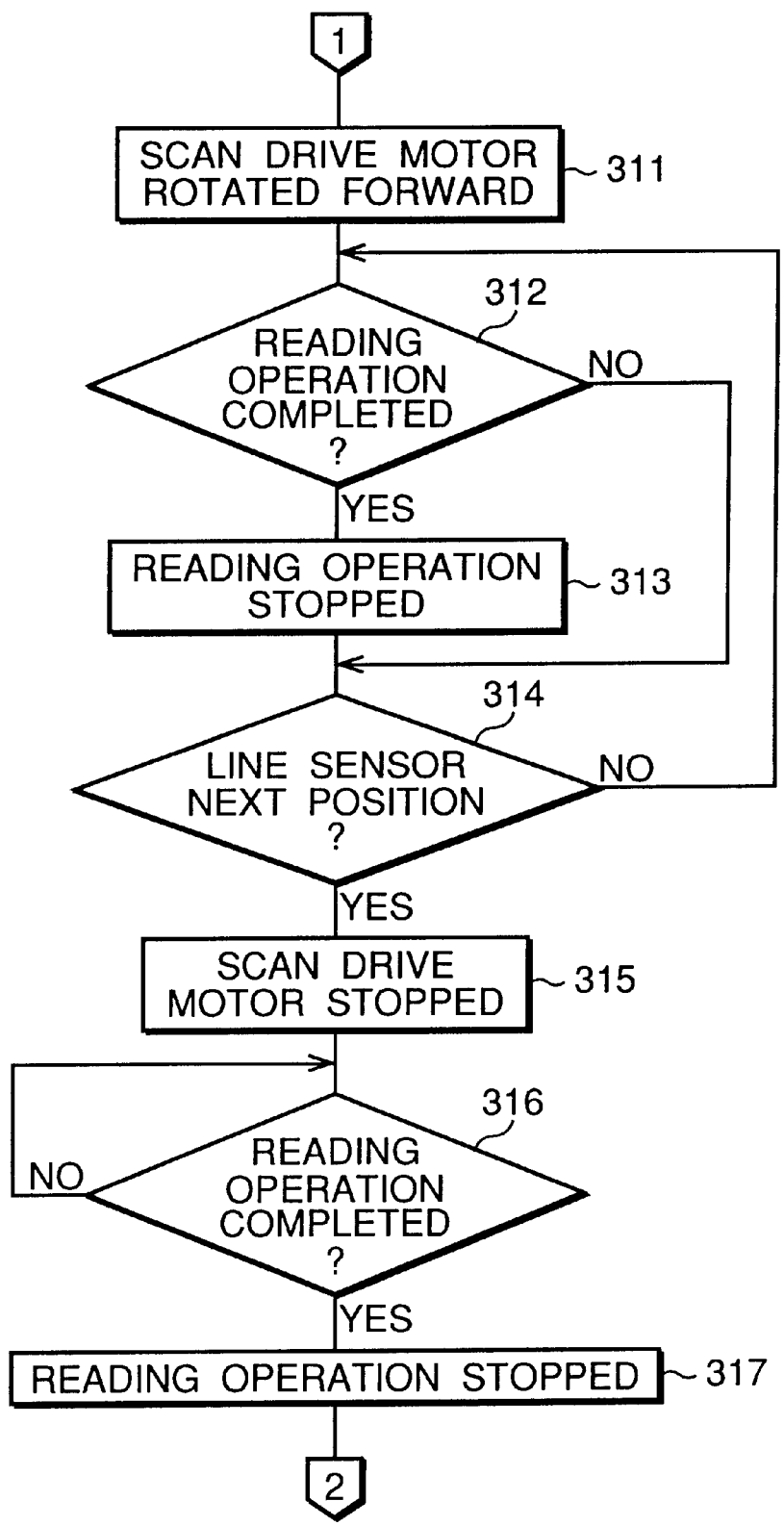
Figure 10C:
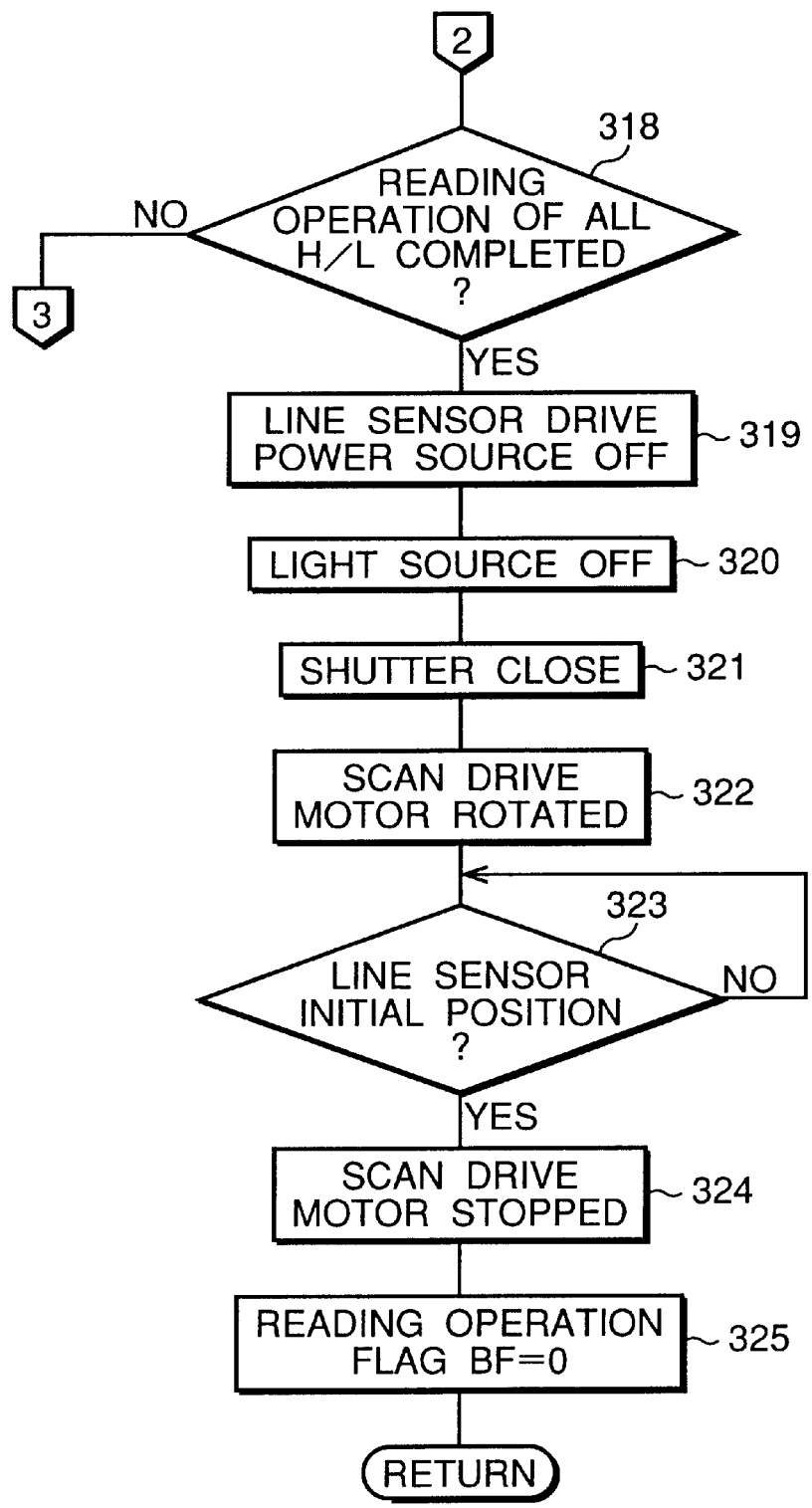
Figure 11A:
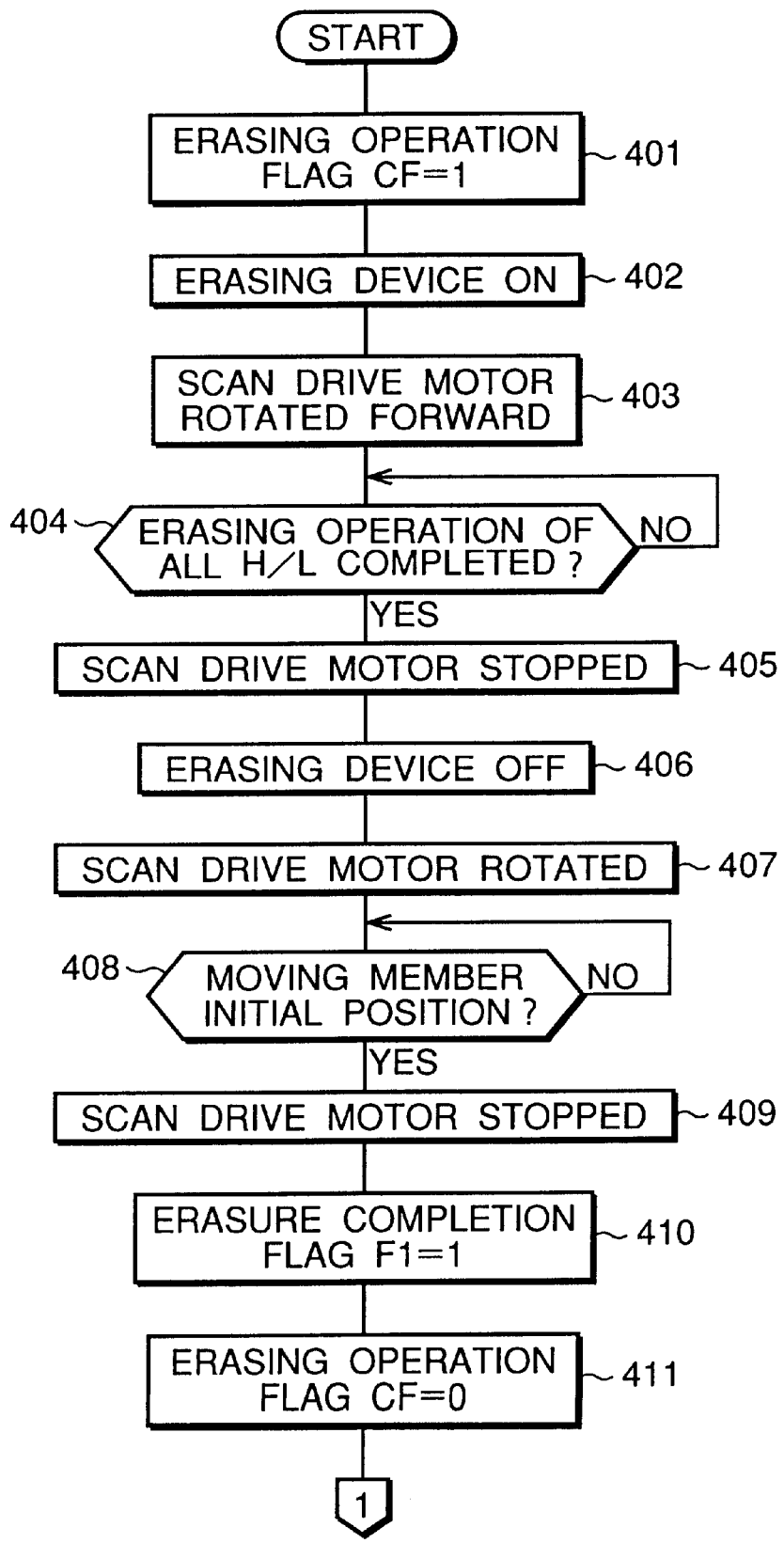
FIGS. 11A and 11B are flow charts of a program for performing an erasing operation.
Figure 11B:
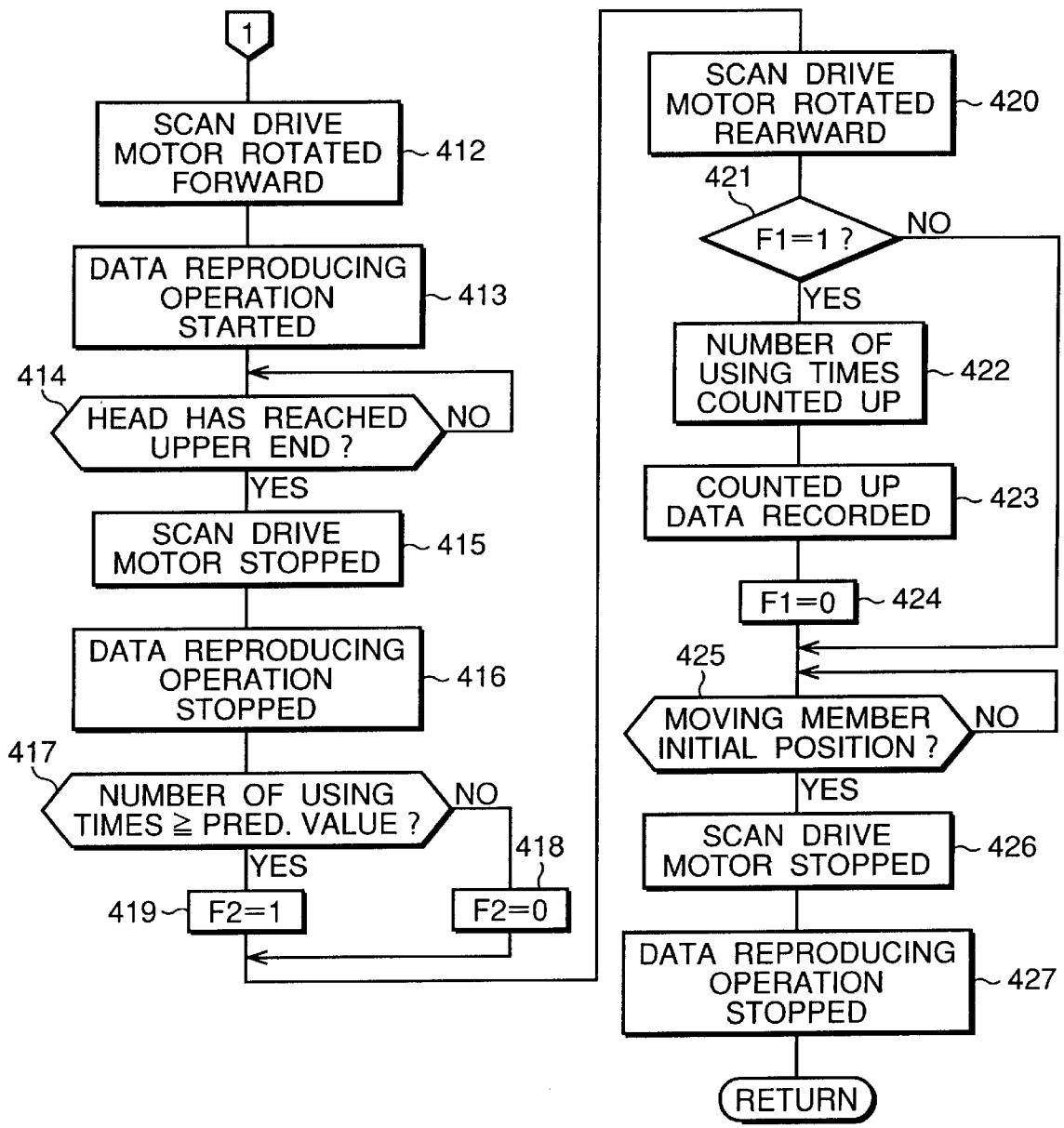

FIG. 7 is a timing chart showing a recording operation (i.e., a photographing operation) in which an image is recorded in the electro-developing recording medium 30, and a reading operation in which the image is read therefrom. FIG. 8 is a flow chart of a program for performing a mode setting operation. FIG. 9 is a flow chart of a program for performing the recording operation. FIGS. 10A, 10B, and 10C are flow charts of a program for performing the reading operation. FIGS. 11A and 11B are flow charts of a program for performing the erasing operation. With reference to these drawings, each of the operations will be described.

Before executing these operations, the mode select switch 16 should be operated so that one of the recording, reading, and erasing operations is selected.

The program of the mode setting operation is executed with interruption during predetermined time intervals. The release switch 14 is operated as a trigger switch. When it is sensed in Step 101 that the trigger switch is turned ON, i.e., that the release switch 14 is depressed, it is determined in Step 102 whether or not the electro-developing type camera is in a recording operation. When a recording operation flag AF (described later) is set to 1, it is determined that the electro-developing type camera is in the recording operation. Thus, Step 102 is repeated. Conversely, when the electro-developing type camera is not in the recording operation, it is determined in Step 103 whether or not the electro-developing type camera is in a reading operation. When a reading operation flag BF (described later) is set to 1, it is determined that the electro-developing type camera is in the reading operation. When the camera is in the reading operation, the process returns to Step 102, and in an operation other than the reading operation, (i.e. Step 103 is NO) it is determined in Step 104 whether or not the electro-developing type camera is in an erasing operation. When an erasing operation flag CF (described later) is set to 1, it is determined that the electro-developing type camera is in the erasing operation, and the process returns to Step 102. In an operation other than the erasing operation, (i.e., Step 104 is NO) the process goes to Step 105.

In Step 105, it is determined whether or not the recording mode is set. When the recording mode is set, the process goes to Step 106, in which it is determined whether or not a usage flag F2 described later has been set to 0. When the usage flag F2 is not 0, namely, when the frequency of the past usage of the electro-developing recording medium 30 is more than or equal to a predetermined value, Step 113 is executed, in which a warning indicates that the electro-developing recording medium 30 cannot be used any more. This program ends. Namely, when the usage is more than or equal to the predetermined value, the recording operation of the electro-developing recording medium 30 is prohibited. Conversely, when the usage flag F2 is 0, namely, when the electro-developing recording medium 30 has not reached the predetermined value, the process goes to Step 110. A subroutine of the recording operation shown in FIG. 9 is executed.

When it is determined in Step 105 that the recording mode is not set, the process goes to Step 107, in which it is determined whether or not the reading mode is set. When the reading mode is set, the process goes to Step 111, where, a subroutine of the reading operation shown in FIGS. 10A, 10B, and 10C is executed. Conversely, when the reading mode is not set, it is determined in Step 108 whether or not the erasing mode is set. When the erasing mode is set, the process goes to Step 112, where, a subroutine of the erasing operation shown in FIGS. 11A and 11B is executed. When none of the recording, reading, and erasing modes are set, the program ends.

The program of the recording operation shown in FIG. 9 will be described below with reference to the timing chart shown in FIG. 7.

When it is sensed that the release switch 14 has been depressed (reference S11), the recording operation is started. First, the recording flag AF is set to 1 in Step 201. Then, in Step 202, an output signal from the photometry sensor 28, i.e., a photometry value is sensed. In Step 203, an exposure calculation is initiated based on the photometry value (reference S12). A recording medium activating signal is outputted in Step 204 (reference S13), applying an electric voltage to the electro-developing recording medium 30. When the completion of the exposure calculation is confirmed in Step 205 (reference S14), the recording operation is performed in Step 206.

In Step 206, the size of the opening of the aperture 12a is adjusted from the fully open state to a predetermined size of the (reference S15). The quick return mirror 21 is changed from the down position to the up position (reference S16). Upon confirmation in Step 207 that the quick return mirror 21 has reached the up position and the adjustment of size of the opening of the aperture 12a has been completed, the shutter 22 is opened in Step 208 (reference S17).

When the exposure time obtained based on the exposure calculation has elapsed and it is confirmed in Step 209 that the exposure has been completed, the shutter 22 is closed in Step 210 (reference S18). With shutter 22 closed, mirror 21 is retailed to the down position is started (reference S19) and a return to a fully open state of the aperture 12a (reference S19). In a Step 212, the output of the recording medium and aperture 12a returns to the open state at Step S211.

Thus, the recording medium activating signal is continuously outputted at least while the shutter 22 is open. During this period, a predetermined voltage is applied to the electro-developing recording medium 30. By exposing the electro-developing recording medium 30 under this condition, the object image is developed on the electro-developing recording medium 30 as a visible image, which is held on the electro-developing recording medium 30 even after the output of the recording medium activating signal is stopped.

When it is confirmed in Step 213 that the mirror 21 and the aperture 12a have returned to the initial conditions thereof, respectively, the mirror 21 and aperture 12a operations stop at Step 214. In Step 215, the recording operation flag AF is reset to 0, and this recording operation ends.

The program of the reading operation shown in FIGS. 10A, 10B, and 10C will be described below.

When the trigger switch (i.e., the release switch 14) is pressed when the reading mode is selected, a scanning command signal is outputted (reference S31), so that the program of the reading operation is executed.

In Step 301, the reading operation flag BF is set to 1. In Step 302, the shutter 22 is opened (reference S32). In Step 303, the light source 42 is turned ON, so that the LEDs 42a are lit. Thus, the electro-developing recording medium 30 is illuminated (reference S33).

In Step 304, a scanner drive signal is output (reference S34), so that the scan drive motor 55 rotates in a forward direction. Thus moving member 52 of the scanning mechanism 50 starts to move upward from the lowest position of the electro-developing recording medium 30 (reference S35), i.e., from the initial position of the scanning mechanism 50. In Step 305, a line sensor drive power source included in the line sensor drive circuit 47 is turned ON (reference S36).

When it is confirmed in Step 306 that the line sensor 44 has been set at a reading start position (i.e., the first horizontal scanning line of the image to be scanned), the output of the scanner drive signal is stopped in Step 307 (reference S37). Thus the scan drive motor 55 is stopped (reference S38). This stopping operation is controlled by counting pulse signals, for example, used for rotating the scan drive motor 55.

Then, in Step 308, an exposure of the line sensor 44 is started, so that an accumulation of an electric charge by the line sensor 44 is performed (reference S39). When it is confirmed in Step 309, (by sensing that a constant time has passed, for example) that the exposure of the line sensor 44 has been completed, in Step 310, a reading operation of the line sensor 44 is started. Pixels signals of one horizontal scanning line are output from the line sensor 44 (reference S40). In Step 311, the scanner drive signal for rotating the scan drive motor 55 in a forward direction is output (reference S41), so that the moving member 52 moves upward (reference S42).

During this movement of the moving member 52, when it is confirmed in Step 312 that a reading scan of the line sensor 44 has been completed, the reading scan is stopped in Step 313 (reference S43). Note that the completion of the reading scan is controlled by counting pulse signals, for example, which are output from the line sensor drive circuit 47 to drive the line sensor 44. If the completion of the reading scan is not confirmed in Step 312, Step 313 is skipped and Step 314 is executed, so that it is determined whether or not the line sensor 44 has been set at the position of the next horizontal scanning line, i.e., the next reading position. When the line sensor 44 has not been set at the position of the next horizontal scanning line, Steps 312 through 314 are executed again.

When it is confirmed in Step 314 that the line sensor 44 has been set at the position of the next horizontal scanning line, the output of the scanner drive signal is stopped in Step 315 (reference S44). Thus the scan drive motor 55 is stopped (reference S45). Then, in Step 316, the completion of the reading scan of the line sensor 44 is confirmed, (in the same way as for Step 312), and the reading scan is stopped in Step 317. Namely, even when the loop of Steps 312 through 314 ends without executing Step 313, the reading scan of the line sensor 44 is completed in Step 317.

In Step 318, it is determined whether a reading scan for all of the horizontal scanning lines has been completed. The number of all of the horizontal scanning lines may be 2000, for example. In Step 318, it is determined whether or not the counter value, which counts every reading operation of one horizontal scanning line, has reached 2000. If the reading operation of all of the horizontal scanning lines has not been completed, the process returns to Step 308, and the operations described above in Steps 308 through 318 are repeated.

Thus, when all of the horizontal scanning lines have been read (reference S50), the process goes from Step 318 to Step 319. In Step 319, the drive power source of the line sensor 44 is turned OFF (reference S51). In Step 320, the light source 42 is turned OFF (reference S52). In Step 321, the shutter 22 is closed (reference S53). In Step 322, a scanner drive signal for operating the scan drive motor 55 in the rearward direction is outputted (reference S54), and thus the moving member 52 starts to descend (reference S55).

During the descending movement of the moving member 52, when it is confirmed in Step 323 that the line sensor 44 has returned to the initial position of the scanning mechanism 50, the output of the scanner drive signal is stopped in Step 324 (reference S56), so that the scan drive motor 55 is stopped (reference S57). Note that the sensing operation of the initial position executed in Step 323 is performed based on a signal output when part of the moving member 52 transverses a photo-interrupter (not shown). Then, the reading operation flag BF is reset to 0 in Step 325, and the program of the reading operation ends.

The program of the erasing operation shown in FIGS. 11A and 11B will be described below.

If the trigger switch (i.e., the release switch 14) is pressed when the erasing mode is selected, an erasing command signal is output to execute the erasing operation. In the erasing operation, the moving member 52 of the scanning mechanism 50 is not intermittently moved as in the reading operation shown in FIGS. 7, 10A, 10B, and 10C (see references S35, S38, S42, and S45), but is continuously (or smoothly) moved.

In Step 401, the erasing operation flag CF is set to 1. In Step 402, the image erasing device 48 is turned ON.

In Step 403, a scanner drive signal is output. The scan drive motor 55 rotates in a forward direction, moving the moving member 52 of the scanning mechanism 50 upward from the lowest position. As a result, the electro-developing recording medium 30 is heated by the image erasing device 48, so that a part of the image, to which the image erasing device 48 faces, is erased. In Step 404, it is determined whether or not an image has been erased in all of the horizontal scanning lines. When all of the horizontal scanning lines has been erased, i.e., when the image erasing device 48 has been moved from the lower end of the image recording area 30a to the upper end thereof, the output of the scanner drive signal is stopped in Step 405, so that the scan drive motor 55 is stopped. In Step 406, the image erasing device 48 is turned OFF.

In Step 407, a scanner drive signal for operating the scan drive motor 55 in the rearward direction is output. The moving member 52 starts to descend. During the descending movement of the moving member 52, when it is confirmed in Step 408 that the moving member 52 has returned to the initial position of the scanning mechanism 50, the output of the scanner drive signal is stopped in Step 409, so that the scan drive motor 55 is stopped. In Step 410, an erasure completion flag F1 is set to 1. In Step 411, the erasing operation flag CF is reset to 0.

Then, in Step 412 and the remaining Steps, it is determined whether or not the frequency of usage, i.e., if the number of times that the recording operation has been performed on the electro-developing recording medium 30 is greater than or equal to a predetermined value. In this determining operation, the moving member 52 of the scanning mechanism 50 is continuously moved upward, similarly to the erasing operation. The distinguishing feature of the determining operation from the erasing operation is that, in the determining operation, the data recording-reproducing head 71 is used instead of the image erasing device 48.

In Step 412, the scan drive motor 55 rotates in a forward direction, and thus the moving member 52 of the scanning mechanism 50 starts to move upward from the lowest position of the electro-developing recording medium 30. In Step 413, a data reproducing operation by the data recording-reproducing head 71 is started, so that a data indicating the frequency of usage, which is recorded in a predetermined portion of the data recording area 73 of the electro-developing recording medium 30, is read. Namely, the reproduction is started at the lower end of the data recording area 73. The direction, in which the data recording-reproducing head 71 is moved, is the same as that in which the image erasing device 48 is moved to erase said image.

Note that, in the data recording area 73 of the electro-developing recording medium 30 in which an image has not been recorded, "0" is recorded beforehand as a data of the frequency of usage.

When it is confirmed in Step 414 that the data recording-reproducing head 71 has reached the upper end of the data recording area 73, the scan drive motor 55 is stopped in Step 415, and the data reproducing operation by the data recording-reproducing head 71 is stopped in Step 416. In Step 417, it is determined whether or not the frequency of usage is more than or equal to the predetermined value. When the frequency of the usage is less than the predetermined value, the usage flag F2 is set to 0 in Step 418, and when the frequency of the usage is more than or equal to the predetermined value, the usage flag F2 is set to 1 in Step 419.

In Step 420, the scan drive motor 55 rotates in a rearward direction, and thus the moving member 52 starts to descend. In step 421, it is determined whether or not the erasure completion flag F1 is 1. When the erasure completion flag F1 is 1, namely when an erasing operation to the electro-developing recording medium 30 was performed in Steps 401 through 411, the process goes to Step 422. Data indicating the frequency of usage, which is recorded in the data recording area 73, is incremented or counted up. The incremented (or counted up) data is recorded in the data recording area 73 by the data recording-reproducing head 71 in Step 423. In Step 424, the erasure completion flag F1 is reset to 0.

Thus, the frequency of usage is counted every time the image recorded on the electro-developing recording medium 30 is erased. The image is erased by the image erasing device 48 while the image erasing device 48 is moved upward. The count-up of the data recording-reproducing head 71 is carried out after the erasing operation of the image erasing device 48 while the data recording-reproducing head 71 is moved downward.

On the other hand, when it is judged in Step 421 that the erasure completion flag F1 is not 1, namely when the erasing operation has not been performed, Steps 422 through 424 are skipped.

During the descending movement of the moving member 52, upon confirmation in Step 425 that the moving member 52 has returned to the initial position of the scanning mechanism 50, the scan drive motor 55 is stopped in Step 426. Then, the data reproducing operation is stopped in Step 427, and the erasing operation program ends.

Figure 12:
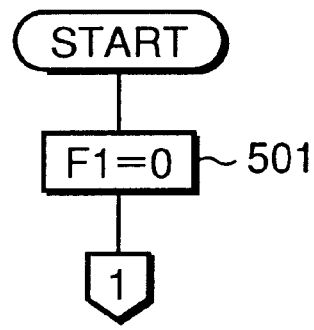
FIG. 12 is a flow chart of a program for performing a mounting operation.

FIG. 12 is a flow chart of a program for performing a mounting operation. This program is executed interruptedly by turning ON the recording medium sensing switch 19 when the electro-developing recording medium 30 is mounted in the electro-developing type camera.

In Step 501, the erasure completion flag F1 is reset to 0. Then, similar Steps as those of the erasing operation, i.e., Steps 412 through 427 shown in FIG. 11B are executed. As a result, when the past frequency of usage of the mounted electro-developing recording medium 30 is more than or equal to a predetermined value, then the usage flag F2 is set to 1. If the past frequency of usage of the mounted electro-developing recording medium 30 is less than the predetermined value, the usage flag F2 is reset to 0. Therefore, when attempting a recording operation of this electro-developing recording medium 30, if the frequency of usage is more than or equal to the predetermined value, a warning is indicated by the display device 68 according to Steps 106 and 113 of the program of the mode setting operation shown in FIG. 8, and the recording operation is prohibited.

As described above, in the first embodiment of the present invention, when the recording and erasing operations of the electro-developing recording medium 30 are repeated a number of times, the electro-developing recording medium 30 has probably deteriorated. The recording operation of the electro-developing recording medium 30 is accordingly prohibited from being carried out any further. Therefore, an image is always recorded on a properly performing electro-developing recording medium. Thus, a desired image is surely recorded on the recording medium.

Figure 13:
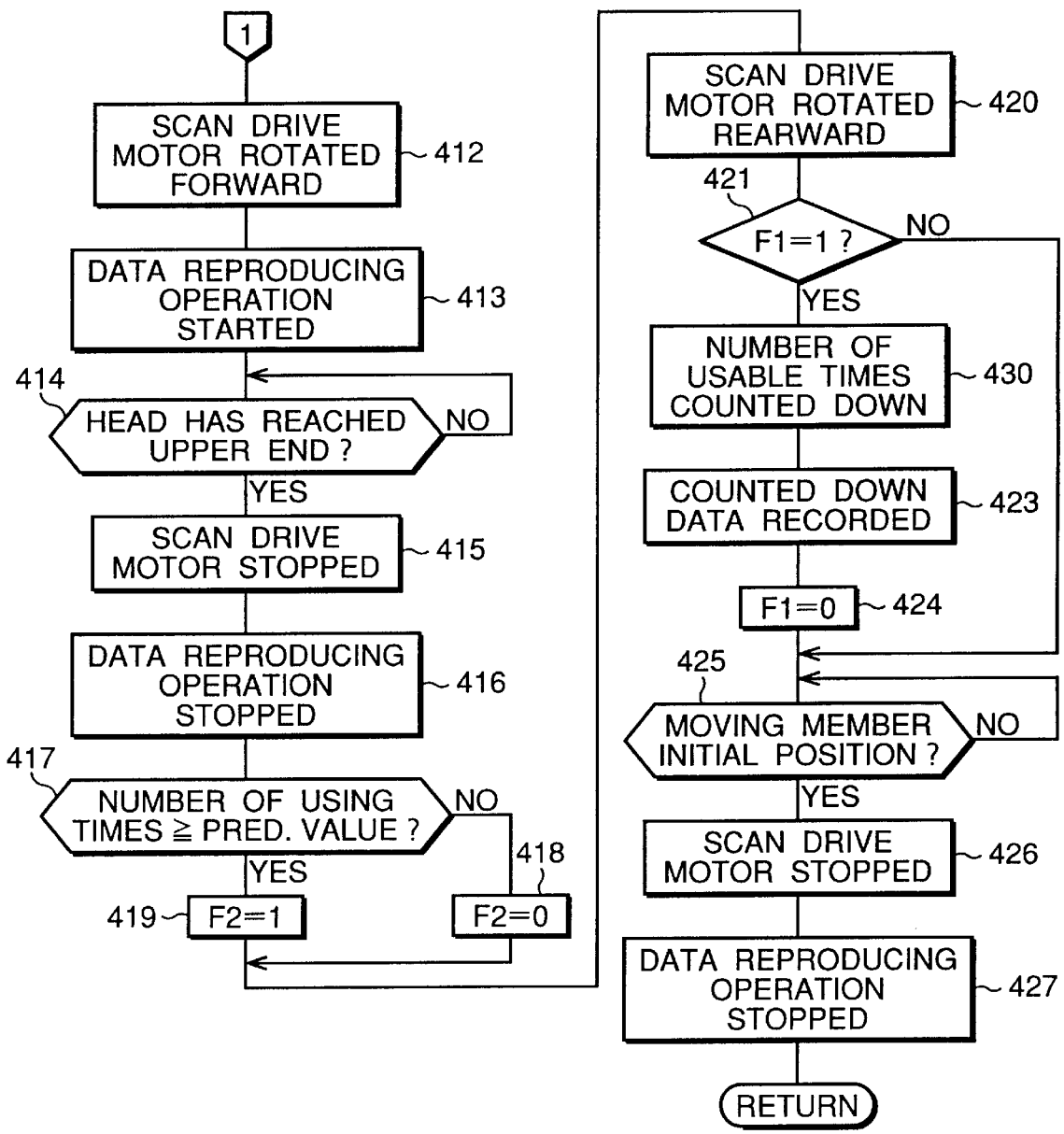
FIG. 13 is a flow chart of a program for performing an erasing operation in a second embodiment.

FIG. 13 is a latter part of a flow chart of a program for performing the erasing operation in a second embodiment. Steps of procedures similar to those of the first embodiment shown in FIG. 11B, are indicated by the same references as those of FIG. 11B. Explanations thereof are omitted. In the second embodiment, the constructions of mechanical and electrical elements provided in the camera body are the same as in the first embodiment.

In the second embodiment, before the electro-developing recording medium 30 is used, i.e., before an image is recorded thereon, the number of available times, by which the recording operation can be carried out, is beforehand recorded in the data recording area 73 of the electro-developing recording medium 30. When an erasing operation has been carried out, it is determined in Step 421 that the erasure completion flag F1 is 1. Therefore, a data indicating the number of available times, which is recorded in the data recording area 73, is counted down or decremented in Step 430. The data which has been counted down is recorded in the data recording area 73 by the data recording-reproducing head 71 in Step 423. Thus, the frequency of usage is counted down every time the image recorded on the electro-developing recording medium 30 is erased. The image is erased by the image erasing device 48 while the image erasing device 48 is moved upward, and the count-down of the data recording-reproducing head 71 is carried out after the erasing operation of the image erasing device 48 while the data recording-reproducing head 71 is moved downward.

As described above, according to the second embodiment, when the frequency of erasing operations of the electro-developing recording medium 30 has become greater than or equal to a predetermined value, so that the electro-developing recording medium 30 cannot be used any more, then the usage is prohibited. Namely, a recording operation of the electro-developing recording medium 30, which may have deteriorated, is prohibited. Therefore, according to the second embodiment, a recording operation can be always carried out properly.

Figure 14:
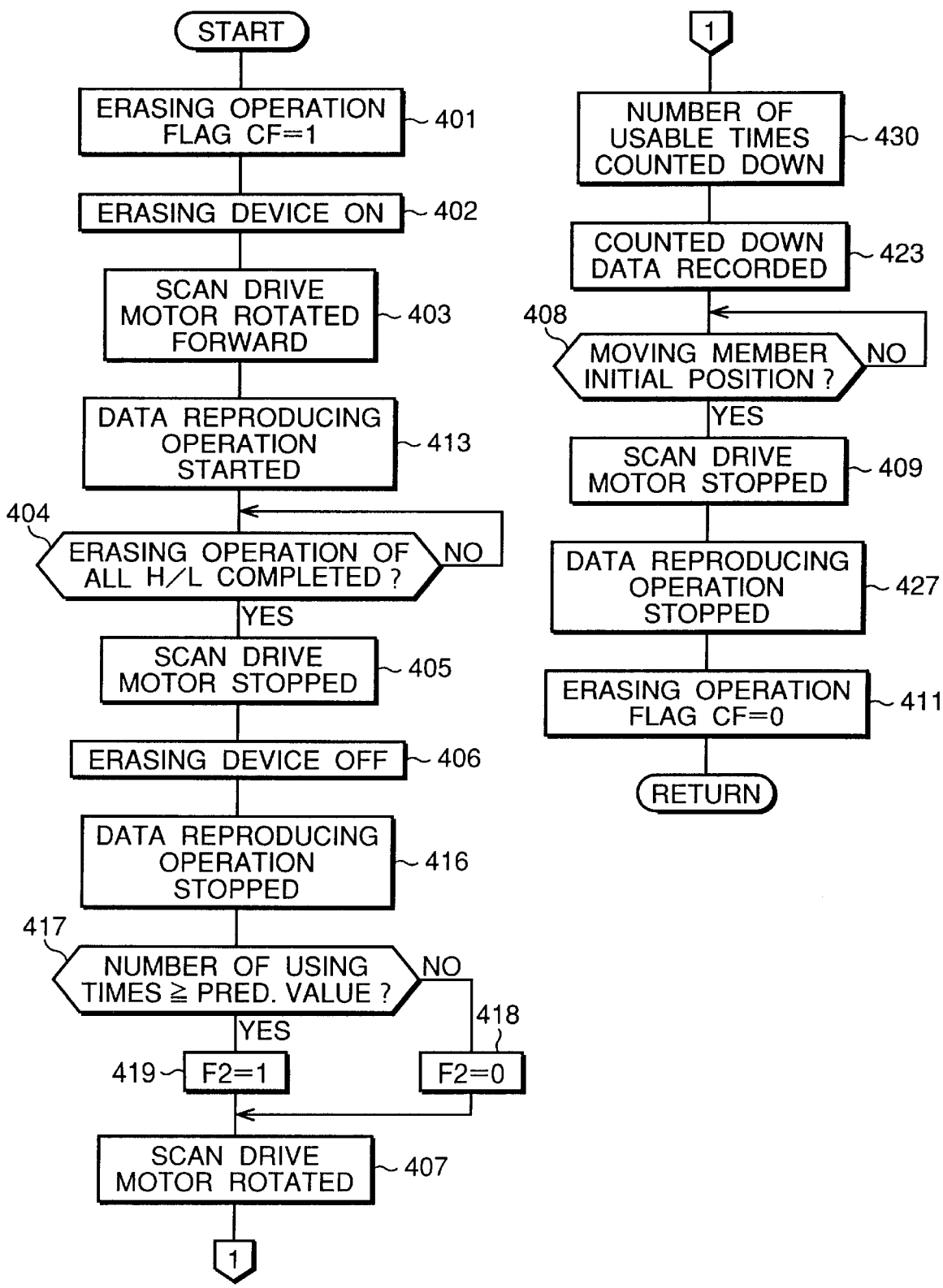
FIG. 14 is a flow chart of a program for performing an erasing operation in a third embodiment.

FIG. 14 is a flow chart of a program for performing the erasing operation in a third embodiment. Steps, in which the same procedures as those of the first and second embodiments shown in FIGS. 11A, 11B, and 13 are executed, are indicated by the same references as those of FIG. 11A, 11B, and 13, and the explanations thereof are omitted. In the third embodiment, the construction of each of mechanical and electrical elements provided in the camera body is the same as in the first and second embodiments.

In the second embodiment, similarly to the second embodiment shown in FIG. 13, before the electro-developing recording medium 30 is used, the number of usable times is beforehand recorded in the data recording area 73 of the electro-developing recording medium 30.

After the executions of Steps 401 through 403, Step 413 is executed in which a data reproducing operation by the data recording-reproducing head 71 is started. Data indicating the number of available times is read. Then, Steps 404 through 406 are executed, and in Step 416, the data reproducing operation by the data recording-reproducing head 71 is stopped. Namely, in the third embodiment, the data recording-reproducing head 71 reads the number of available times while the image erasing device 48 erases the image recorded on the electro-developing recording medium 30.

Then, when it is determined in Step 417 that the number of available times is less than the predetermined value, the usage flag F2 is set to 0 in Step 418, and when the number of the available times is greater than or equal to the predetermined value, the usage flag F2 is set to 1 in Step 419.

In Step 407, the scan drive motor 55 rotates in the rearward direction. Thus the moving member 52 starts to descend. In Step 430, data indicating the number of available times, which is recorded in the data recording area 73, is counted down. Data which has been counted down, is also recorded in the data recording area 73. When it is confirmed in Step 408 that the moving member 52 has returned to the initial position, the output of the scanner drive signal is stopped in Step 409, so that the scan drive motor 55 is stopped. Then, in Step 427, the data reproducing operation of the data recording area 73 is stopped. In Step 411, the erasing operation flag CF is reset to 0. Thus, this program of the erasing operation ends.

According to the third embodiment, the upward and downward movements of the moving member 52 carried out only once in the erasing operation of the electro-developing recording medium 30, so that the operation of the third embodiment is simpler than the first and second embodiments.

Note that, although the image erasing device 48 and the data recording-reproducing head 71 are moved in the erasing operation and the data recording operation, in which the frequency of usage or available times is recorded in the data recording area 73, in the first through third embodiments, the electro-developing recording medium 30 can be moved instead of the image erasing device 48 and the data recording-reproducing head 71.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-60133 (filed on Feb. 22, 1996) which is expressly incorporated herein, by reference, in its entirety.

I claim:

1. A device for controlling the frequency of usage of an electro-developing recording medium by which an image formed in an image recording area of said electro-developing recording medium is electronically developed and recorded therein, said control device comprising:
   a data recording area formed outside of said image recording area;
   a data recording processor that records a frequency of recording operations representing a number of times said image is recorded in said image recording area, in said data recording area;
   an image erasing processor capable of erasing an image recorded in said image recording area so that a new image can be recorded in said image recording area;
   a data reading processor that reads said frequency of said recording operations from said data recording area after an image is erased from said image recording area; and
   a control processor that determines whether the recording medium is recordable, and prohibits recording in said image recording area when said frequency of recording read by said data reading processor exceeds a predetermined value.

2. A control device according to claim 1, further comprising a prohibiting processor which prohibits recording on said image recording area when said number of times exceeds a predetermined value.

3. A control device according to claim 1, wherein data is recorded magnetically in said data recording area.

4. A control device according to claim 3, wherein said data recording processor and said data reading processor comprise a common magnetic head.

5. A control device according to claim 3, wherein said image erasing device erases said image while one of said image erasing device and said electro-developing recording medium is moved in such a manner that said image erasing device scans said electro-developing recording medium.

6. A control device according to claim 5, wherein one of said data reading processor and said electro-developing recording medium is moved in a predetermined direction to read said number of times, said predetermined direction being the same as that in which one of said image erasing device and said electro-developing recording medium is moved to erase said image.

7. A control device according to claim 5, wherein, in said data recording area of said electro-developing recording medium in which any image has not been recorded, "0" is recorded as said number of times.

8. A control device according to claim 5, wherein said image is erased by said image erasing device while one of said image erasing device and said electro-developing recording medium is moved in a first direction, and the count of said data recording processor is carried out after an erasing operation of said image erasing device while one of said data recording processor and said electro-developing recording medium is moved in a second direction opposite to said first direction.

9. A control device according to claim 5, wherein said data recording processor decrements said number of times every time said image recorded on said image recording area is erased.

10. A control device according to claim 9, wherein, in said data recording area of said electro-developing recording medium in which any image has not been recorded, the number of available times, by which said recording operation can be carried out, is recorded.

11. A control device according to claim 9, wherein said image is erased by said image erasing device while one of said image erasing device and said electro-developing recording medium is moved in a first direction, and the decrement of said data recording processor is carried out after the erasing operation while one of said data recording processor and said electro-developing recording medium is moved in a second direction opposite to said first direction.

12. A control device according to claim 5, wherein said data reading processor reads said number of times while said image erasing device erases said image.

13. A control device according to claim 1, wherein said data recording processor moves to record said number of times, and said data recording area extends along a direction in which said data recording processor moves.

14. A control device according to claim 1, wherein said electro-developing recording medium comprises an electrostatic information recording medium generating an electric charge in accordance with an image formed thereon, and an electric charge storage medium which generates a visible image in accordance with said electric charge and which can hold said visible image.

15. A control device according to claim 14, wherein said electric charge storage medium is a liquid crystal display having a memory-type liquid crystal.

16. The device of claim 1, wherein said data recording processor and the data reading processor comprise a single head, and said data recording area is formed in a recording medium which is read and written by said single head.

17. A device for controlling the frequency of usage of an electro-developing recording medium by which an image is electronically developed, said electro-developing recording medium having an image recording area and a data recording area, said control device comprising:

an image recording processor for performing a recording operation in which said image is recorded in said image recording area;

an image erasing processor for performing an erasing operation in which said image recorded in said image recording area is erased;

a data recording processor for recording the number of times of one of said recording operation and said erasing operation after an image is erased from said image recording area; and a control processor that determines whether the recording medium is recordable, and prohibits recording in said image recording area when said frequency of recording read by said data recording processor exceeds a predetermined value.

\* \* \* \* \*